United States Patent
Zhao et al.

(10) Patent No.: US 9,323,792 B2
(45) Date of Patent: *Apr. 26, 2016

(54) WEB MINING TO BUILD A LANDMARK DATABASE AND APPLICATIONS THEREOF

(71) Applicant: Google Inc., Mountain View, CA (US)

(72) Inventors: Ming Zhao, Sunnyvale, CA (US); Yantao Zheng, Mountain View, CA (US); Yang Song, San Jose, CA (US); Hartwig Adam, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/314,948

(22) Filed: Jun. 25, 2014

(65) Prior Publication Data
US 2014/0310319 A1    Oct. 16, 2014

Related U.S. Application Data

(63) Continuation of application No. 12/269,445, filed on Nov. 12, 2008, now Pat. No. 8,788,504.

(51) Int. Cl.
*G06F 7/00* (2006.01)
*G06F 17/30* (2006.01)
*G06F 17/00* (2006.01)

(52) U.S. Cl.
CPC .... *G06F 17/30289* (2013.01); *G06F 17/30247* (2013.01); *G06F 17/30265* (2013.01); *G06F 17/30312* (2013.01); *G06F 17/30861* (2013.01)

(58) Field of Classification Search
CPC ............ G06F 17/30247; G06F 17/30312; G06F 17/30289; G06F 17/30861; G06F 17/30265

USPC .................................................. 707/741, 915
See application file for complete search history.

(56) References Cited

U.S. PATENT DOCUMENTS

| | | | |
|---|---|---|---|
| 5,961,572 A | 10/1999 | Craport et al. | |
| 6,347,313 B1 | 2/2002 | Ma et al. | |
| 6,397,208 B1 * | 5/2002 | Lee | 707/724 |
| 7,043,094 B2 | 5/2006 | Thomas et al. | |
| 7,324,666 B2 | 1/2008 | Zoken et al. | |
| 7,359,889 B2 | 4/2008 | Wang et al. | |
| 7,474,759 B2 | 1/2009 | Sternberg et al. | |
| 2002/0103809 A1 * | 8/2002 | Starzl et al. | 707/102 |
| 2003/0039410 A1 * | 2/2003 | Beeman et al. | 382/305 |
| 2005/0162523 A1 | 7/2005 | Darrell et al. | |

(Continued)

OTHER PUBLICATIONS

Lyndon S. Kennedy, Mor Naaman, Generating diverse and representative image search results for landmarks, Proceeding of the 17th international conference on World Wide Web, Apr. 21-25, 2008.

(Continued)

*Primary Examiner* — Kannan Shanmugasundaram
(74) *Attorney, Agent, or Firm* — IP Spring (57) ABSTRACT

This invention relates to building a landmark database from web data. In one embodiment, a computer-implemented method builds a landmark database. Web data including a web page is received from one or more websites via one or more networks. The web data is interpreted using at least one processor to determine landmark data describing a landmark. At least a portion of the landmark data identifies a landmark. Finally, a visual model is generated using the landmark data. A computing device is able to recognize the landmark in an image based on the visual model.

20 Claims, 5 Drawing Sheets

(56) References Cited

U.S. PATENT DOCUMENTS

| | | | |
|---|---|---|---|
| 2006/0251292 A1* | 11/2006 | Gokturk et al. | 382/103 |
| 2007/0081744 A1 | 4/2007 | Gokturk et al. | |
| 2007/0127819 A1* | 6/2007 | Lee et al. | 382/190 |
| 2007/0211080 A1 | 9/2007 | Adams | |
| 2007/0263092 A1 | 11/2007 | Fedorovskaya et al. | |
| 2007/0276845 A1 | 11/2007 | Geilich | |

OTHER PUBLICATIONS

T.Yeh, K.Tollmar,T.Darrell, "Searching the Web with Mobile Images for Location Recognition", CVPR, 2004.
Bentley, J.L., "Multidimensional Binary Search Trees Used for Associative Searching," Commun. ACM, Sep. 1975; 9 Pages.
Bishop, C.M., "Pattern Recognition and Machine Learning," Springer, Aug. 2006; pp. 21-23, 424-429 and 561-569.
Everingham et al., "The PASCAL Visual Object Classes Challenge 2007 (VOC2007) Results," downloaded from http://pascallin.ecs.soton.ac.uk/challengesNOC/voc2007/results/index.shtml on Jan. 5, 2009; 3 pages.
Griffin, et al., "Caltech-256 Object Category Dataset," Technical Report, California Institute of Technology, 2007; 20 pages.
Goesele, et al., "Multi-View Stereo for Community Photo Collections," Proc. of IEEE Conf on Computer Vision, 2007; 8 pages.
Hays, et al., "im2gps: Estimating Geographic Information from a Single Image," Proc. of Conf on Computer Vision and Pattern Recognition, Jun. 2008; 8 pages.
Kennedy, et al., "Generating Diverse and Representative Image Search Results for Landmarks," Proc. of Conf on World Wide Web, 2008; 10 pages.
Li, et al., "Modeling and Recognition of Landmark Image Collections Using Iconic Scene Graphs," ECCV, 2008; 14 pages.
Lowe, D., "Distinctive Image Features from Scale-Invariant Keypoints," International Journal of Computer Vision, 2003, 28 pages.
Lowe, D., "Object Recognition from Local Scale-Invariant Features," ICCV 99, 1999, pp. 1150-1157.
Mikolajczyk, et al., "Scale & Affine Invariant Interest Point Detectors," International Journal of Computer Vision, International Journal of Computer Vision, 2004, pp. 63-86.
Quack, et al., "World-Scale Mining of Objects and Events from Community Photo Collections," Proc. of Conf. on Content-Based Image and Video Retrieval, Jul. 2008, 10 pages.
Sivic, et al., "Video Google: A Text Retrieval Approach to Object Matching in Videos," Proceedings of the Ninth IEEE International Conference on Computer Vision, 2003, 8 Pages.
Snavely, et al., "Photo Tourism: Exploring Photo Collections in 3D," ACM Transactions on Graphics, 2006, pp. 835-846.
Viola, et al. "Rapid Object Detection using a Boosted Cascade of Simple Features," Proc. of Conf on Computer Vision and Pattern Recognition, 2001, pp. 511-518.
Yi, et al., "A Classifier for Semi-Structured Documents," Proc. of Conf on Knowledge Discovery and Data Mining, 2000, pp. 340-344.

* cited by examiner

WEB MINING TO BUILD A LANDMARK DATABASE AND APPLICATIONS THEREOF

CROSS-REFERENCE TO RELATED APPLICATIONS

This application is a continuation of U.S. application Ser. No. 12/269,445, filed Nov. 12, 2008, the disclosure of which is expressly incorporated herein by reference in its entirety.

BACKGROUND

1. Field of the Invention

This invention generally relates to data mining.

2. Background Art

Landmarks can include easily recognizable, well-known places and buildings, such as, for example, monuments, churches, historical sites, and seats of government. For tourists, visiting landmarks may be important parts of their tours. For this reason, tourists often take photographs or videos of landmarks. Many tourists share their photographs over the Internet through photo-sharing websites, such as a PICASA WEB site.

Automatically recognizing landmarks in images and videos is useful for several reasons. First, by capturing the visual characteristics of landmarks, a landmark recognition engine may identify clean, unobscured landmark images. The clean landmark images may be used in virtual tourism to simulate a tour for a user. Second, a landmark recognition engine may be used to geolocate media and to generate a description of media content. Third, a landmark recognition engine may be used to catalogue media by landmark. When media are catalogued by landmark, they may be used, for example, to provide tour guide recommendations.

To recognize a landmark, a landmark recognition engine correlates an image of a landmark with known images of the landmark. To make the correlation, the landmark recognition engine needs a visual model based on or comprised of known images of the landmark. Thus, a landmark recognition engine relies on a landmark database with a listing of landmarks and corresponding visual models to recognize landmarks.

At present, efforts to automatically generate a landmark database have used data from photo-sharing websites. While this approach has advantages, the resulting landmark database tends to be biased to the interests of a particular user group.

Systems and methods are needed that build a large, comprehensive landmark database from a broader range of publicly available photos.

BRIEF SUMMARY

This invention relates to building a landmark database from web data. In one embodiment, a computer-implemented method builds a landmark database. Web data including a web page is received from one or more websites via one or more networks. The web data is interpreted using at least one processor to determine landmark data describing a landmark. At least a portion of the landmark data identifies a landmark. Finally, a visual model is generated using images determined based on the landmark data. A computing device is able to recognize the landmark in an image based on the visual model.

In another embodiment, a system builds a landmark database. The system includes a web data retriever module configured to receive web data including a web page from one or more websites via one or more networks. A web data interpreter module is configured to interpret the web data to determine landmark data describing a landmark. At least a portion of the landmark data identifies a landmark. Finally, a visual model generator is configured to generate a visual model using images determined based on the landmark data. A computing device is able to recognize the landmark in an image based on the visual model.

By mining web data, embodiments of the present invention can build a large, comprehensive landmark database that may be used to recognize landmarks.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF THE INVENTION

Embodiments of the present invention mine landmark information from the web to build a landmark database. The landmark database may be used to recognize landmarks in images. By using the vast amount of data available on the web, embodiments may build a landmark database that is large and comprehensive. Accordingly, a landmark recognition engine may recognize a large number of landmarks using the landmark database.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
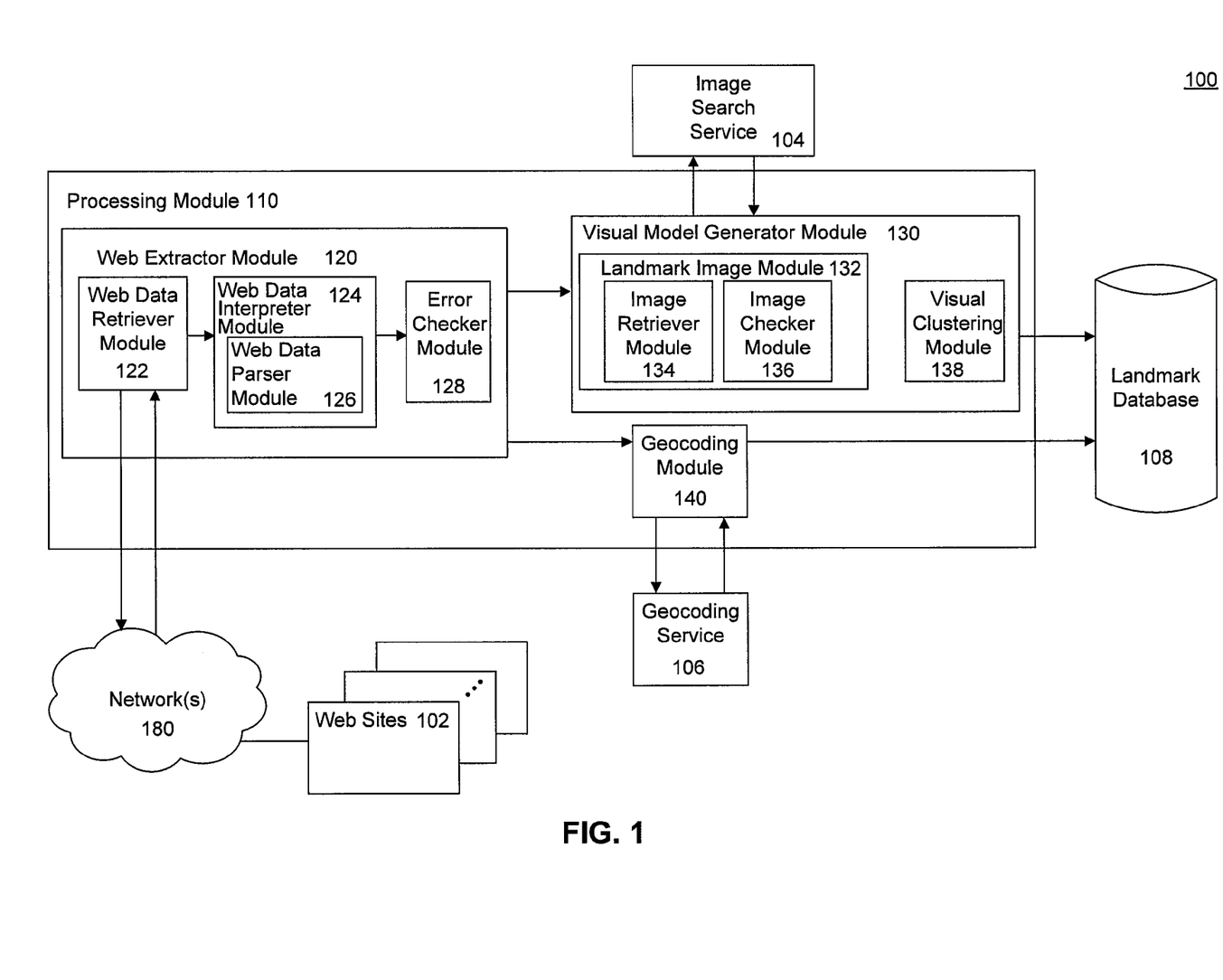
FIG. 1 is a diagram illustrating a system for mining web data to build a landmark database according to an embodiment of the present invention.

FIG. 1 is a diagram illustrating a system 100 for mining web data to build a landmark database according to an embodiment of the present invention. System 100 includes a processing module 110 that builds a landmark database 108 based on data from websites 102 retrieved via one or more networks 180, such as the Internet. To build landmark database 108, processing module 110 includes a web data extractor module 120 and visual model generator module 130.

In general, system 100 operates as follows. Web extractor module 120 retrieves web data from one or more websites 102. Web extractor module 120 interprets the web data to determine landmark information. The landmark information may include a list of landmark names. Using the landmark names, geocoding module 140 determines a location for each landmark. Also using the landmark names, visual model generator 130 finds images of each landmark and constructs a visual model of the landmark. The visual model may be used, for example, to recognize a landmark. Finally, the landmark data, landmark locations and visual model are stored in landmark database 108. Each of the components are discussed in greater detail below.

In the illustrated embodiment, web extractor module 120 includes a web data retriever module 122 configured to retrieve web data from one or more websites 102. Web data retriever module 122 is configured to know where on the Internet to find websites 102. For example, web data retriever module 122 may be configured to navigate through a travel site such as a wikitravel.com site. To navigate through the travel site, web data retriever module 122 may know the Uniform Resource Locator (URL) patterns to access web data (such as web pages) of the site that describe landmarks. Alternatively, web data retriever module 122 may know a URL of one or more pages that link to pages that describe landmarks. Either way, web data retriever module 122 is configured to know or determine the location of web data that includes information about landmarks. An example operation of web data retriever module 122 is described in detail below.

Using the URLs, web data retriever module 122 retrieves web data. In an example operation, web data retriever module 122 sends an HTTP request addressed to a URL of a website 102. Website 102, for example, may be accessed through a web server that responds to an HTTP request with an HTTP response. The HTTP response may include web data with information about a landmark. In an example, the web data may include a web page. The web page may include Hypertext Markup Language (HTML), extendable markup language (XML), images, scripts or multimedia content.

Once the web data is retrieved, a web data interpreter module 124 may interpret the web data to determine landmark data describing a landmark. To determine the landmark data, web data interpreter module 124 may use a web data parser module 126 to parse the web data based on one or more extraction rules. The extraction rules may be based on semantics clues embedded in the structure of the web data. For example, web data parser module 126 may search the web data for one or more tags or headers. At the location of a tag or header, web data parser module 126 may extract a portion of text from the web data. That portion of text may include information about a landmark. For example, the landmark data may include the name of the landmark. The landmark data may include a city, country, or continent where the landmark is located.

In other embodiments, web data interpreter module 124 may extract the landmark data using computer vision techniques instead of or in addition to text parsing. An example operation of web extractor module 120 is described in detail in later sections with respect to FIG. 3.

The accuracy of the landmark data determined by web data interpreter module 124 depends on how consistently the web data is formatted. Many travel sites, such as a wikitravel.com site, are formatted fairly consistently. Still, users making contributions to a travel site, for example through a wiki, may raise the possibility that some of the web data is formatted inconsistently.

To deal with inconsistent formatting, error checker module 128 may apply one or error checking rules to improve the quality of the landmark data. The error checking rules may be heuristics used to determine whether a name is likely a real landmark name as opposed to other text captured by accident. The error checking rules may include checking to see that a landmark name is not too long or that a majority of the words in a landmark name start with a capital letter. If error checker module 128 determines that a landmark data is inaccurate, then error checker module 128 may remove the landmark data from the list of landmarks sent onto visual module generator module 130 and geocoding module 140.

In one embodiment, the landmark data parsed from the web data may include a geolocation (e.g. latitude/longitude) of the landmark. In that embodiment, no further geocoding step is necessary. In other cases, geocoding module 140 may determine a location of the landmark.

Geocoding module 140 determines landmark locations. In an embodiment, geocoding module 140 may receive a list of landmarks with each landmark described by some landmark data. The landmark data may include a landmark name and a city, country or continent where the landmark is located. Geocoding module 140 determines a specific location (such as a latitude/longitude) of the landmark. To determine the location, geocoding module 140 may access a geocoding service 106. Geocoding module 140 may send a request to geocoding service 106. In response, geocoding service 106 may look up a latitude/longitude location and send the location back to geocoding service 106. The request from geocoding service 106 may include a landmark name and city.

In another embodiment, the landmark data parsed from the web data may include a street address. In that embodiment, the request sent to geocoding service 106 may include the street address of the landmark. In response to the request, geocoding service 106 looks up the location of the address and sends the location of the address back to geocoding module 140. In some cases, only a partial street address, such as the city name, may be available. In that case, geocoding module 140 may use the available information to estimate the location of the landmark.

In a third embodiment, geocoding module 140 may determine a landmark location by correlating an image of a landmark with one or more images with known locations. The landmark image may be determined using an image search as is discussed below. The images with known locations may be part of an image database, photo-sharing website, or a street view image database. The images may have location information embedded, for example, by a digital camera in an Extendable Image File (EXIF) header. The images may be correlated with the landmark image using an image matching algorithm. When geocoding module 140 finds a match, the location of the matching image is adopted as the landmark location, or an aggregation of the combination of locations from the images is adopted as the landmark location.

Either serially or in parallel with geocoding module 140 determining the location of the landmark, visual model generator module 130 generates a visual model of the landmark. To generate the visual model, visual model generator module 130 first determines images of the landmark based on the landmark data with landmark image module 132. Then, visual model generator module 130 constructs the visual model with visual clustering module 138.

Landmark image module 132 determines images of the landmark based on landmark data. Landmark image module 132 may request an image search with an image retriever module 134. Image retriever module 134 may generate a search query based on landmark data. Image retriever module 134 may send the search query to an image search service 104. Image search service 104 may be any image search engine, such as a GOOGLE Image Search engine. In response to the search query, image search service 104 may send back a set of results.

Image retriever module 134 may generate the search query to maximize the effectiveness and accuracy of image search service 104. To generate the query, image retriever module 134 may concatenate a landmark name and its city. For example if the landmark name is "Eiffel Tower" and its city is "Paris", the search query may be "Eiffel Tower Paris".

Some image search engines, such as the GOOGLE Image Search engine, take individual words in the query as an AND relation. In those embodiments, image retriever module 134 may use additional rules to ensure better image search results are obtained. For example, image retriever module 134 may not add country in the query, as adding the country may make the returned images more relevant to the country than to the landmark. If the landmark name consists of less than four words, image search engines may put quotes around the landmark name to ensure that image search service 104 searches for the an exact phrase. If the landmark consists of four or more words, image retriever module 134 may not use quotes, as the AND relation between words in the long landmark name may make the query sufficiently distinctive.

Image retriever module 134 sends a search query and receives a set of search results from image search service 104. The search results may have a large number of false positives. To determine a visual model from the image results, the images may undergo visual clustering by a visual clustering module 138 and pruning by an image checker 136. In one embodiment, the visual clustering may occur prior to the pruning. In another embodiment, the pruning may occur prior to the visual clustering.

The images that are useful for constructing a visual model are generally photos of a large portion of the landmark without too many other objects. However, the search results may also include images, for example, of maps, manuals, and logos. Some results may show the landmark obstructed by faces or include large amounts of blank spaces. To deal with this, landmark image module 132 may use an image checker module 136 to filter out some of the images. Image checker module 136 may include one or more classifiers trained to detect undesirable image types.

One possible classifier is trained to distinguish a photographic vs. non-photographic image. The classifier may be trained using an Adaboost algorithm with low-level visual features such as those extracted with a color histogram and hough transform. Also, a face detector may be used to filter out photos where a landmark is obstructed by one or more faces. Image checker module 136 may use any face detector or image classifier as is known to those of skill in the art of computer vision.

In addition to filtering out undesirable image types, a visual clustering module 138 may be used to identify similar images in the result set. Given that a large number of the remaining images in the result set are of the landmark, identifying these similar images further helps to narrow the result set. Any visual clustering technique known to those of skill in the art may be used. One such visual clustering technique is discussed in U.S. patent application Ser. No. 12/119,359, "Automatic Discovery of Popular Landmarks", which is incorporated by reference herein in its entirety. Visual clustering uses object instance recognition techniques that are robust to variations in image capturing conditions, illuminations, scale, translation, clutter and occlusion and, in part, affine transformation. Based on the object recognition, clusters of similar images are formed. The resulting dense clusters of images are highly probable to contain true landmark photos that depict the landmarks from similar perspectives.

The landmark images selected by visual clustering module 138 may be saved as a visual model in landmark database 108 along with landmark data identifying the landmark (such as a landmark name). A computing device may use the images to recognize whether a landmark exists in an image, including a photograph or a frame of a video. To recognize whether a landmark exists in an image, a computing device may use visual clustering to determine that an image is similar to the images including the landmark.

In an alternative embodiment, visual model generator module 130 may use the landmark images to generate a general visual model of the landmark. In that embodiment, the visual model is saved to landmark database 108. A computing device may use the visual model to recognize the landmark in images. Any modeling or recognition technique may be used as is known to those of skill in the art.

Each of processing module 110, web extractor module 120, visual model generator module 130, web data retriever module 122, web data interpreter module 124, web data parser module 126, error checker module 128, geocoding module 140, visual model generator module 130, landmark image module 132, image retriever module 134, image checker module 136, and visual clustering module 138 may be implemented in hardware, software firmware or any combination thereof.

In one example, the modules of system 100 may be software modules that run on one or more computing devices. A computing device may include a computer, workstation, distributed computing system, embedded system, stand-alone electronic device, networked device, mobile device, rack server, television, set top box, mobile computing device or other type of computer system. A computing device may include a processor and a memory. The memory may include a primary and a secondary storage device. The computing device may have input and output devices including a user input device and a display device. The computing device may also have a network interface that enables the computing device to communicate over a network.

Image search service 104 and geocoding service 106 may be any types of service, including, but not limited to, a web service running on a web server. The web server may be a software component running on a computing device. Similarly, websites 102 may be any source of web data. In an example, websites 102 may be web servers addressable over one or more networks, such as the Internet. Again, the web servers may be a software component running on a computing device.

Figure 2:
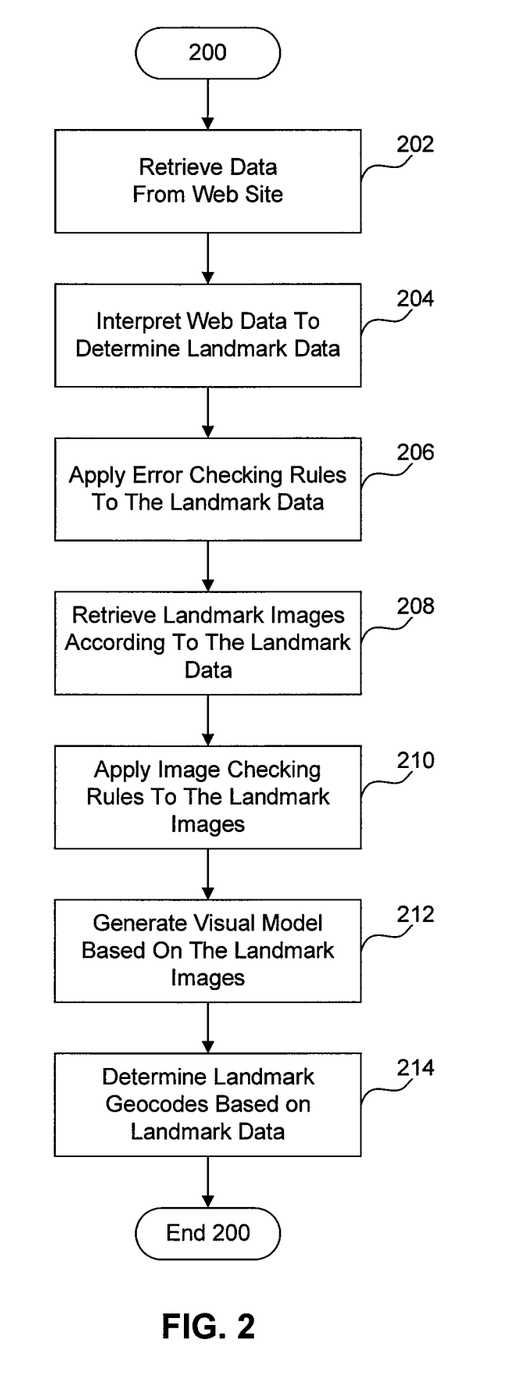
FIG. 2 is a flowchart illustrating a method for mining web data to build a landmark database according to an embodiment of the present invention.

FIG. 2 is a flowchart illustrating a method 200 for mining web data to build a landmark database according to an embodiment of the present invention. Method 200 may be used in operation of system 100 in FIG. 1. Method 200 is described with respect to illustrative examples in FIGS. 3-5. These examples are provided for clarity, and method 200 should not be limited thereto.

Method 200 begins by retrieving web data from one or more websites at step 202. As discussed above, web data may be retrieved according to the structure of the websites. One example website, a wikitravel.com site, is organized according to a geographical hierarchy. A main page of the wikitravel.com site may include links to pages for each continent. Each continent page includes links to pages for countries in the continent. Each country page includes links to pages for cities in the country. Finally, each city page includes information about landmarks located within the city. The term "city" used in reference to the wikitravel.com site is a flexible concept that includes both an urban area and a larger metropolitan area with suburbs and satellite cities. With this hierarchy, web data may be retrieved recursively from the wikitravel.com site.

In one example operation of step 202, a main page of wikitravel may be retrieved. The main page may include a list of links to continent pages that includes a link to a page for Asia. Using the link, the page for Asia is retrieved. The page for Asia may include a list of links to country pages including a link to a page for Japan. Using the link, the page for Japan is retrieved. The page for Japan may include a list of links to city pages including a link to a page for Kyoto. The page for Kyoto is retrieved as illustrated with a page 300 in FIG. 3. Page 300 for Kyoto includes information about landmarks located within Kyoto.

After retrieving the web data at step 202, the web data is interpreted to determine landmark data at step 204. As mentioned earlier, the web data may be one or more web pages formatted in HTML. In the example of a wikitravel article, the HTML document may have a tree structure $e_d$, where the interior nodes may correspond to tagged elements and the leaf nodes store text. A travel guide article may be modeled as $d=\{e_d(i,j), t_d(i,j)\}$, where $e_d(i,j)$ is the jth node at level i of tree $e_d$ and $t_d(i,j)$ is the text stored at node $e_d(i,j)$. To extract the landmark names, the text of the leaf nodes, $t_d(i_{leaf},j)$ is determined to be either landmark or non-landmark names.

To determine whether the text of the leaf nodes is a landmark name, heuristic rules may be used. In the example of a wikitravel.com page, three heuristic rules may be used. If all of the following three conditions are true, then the text may be a candidate for a landmark name. Otherwise, the text may not be a landmark name. First, $e_d(i_{leaf},j)$ must be within a section entitled "See" or "To See" in the HTML document. Second, $e_d(i_{leaf},j)$ must be a child of a node indicating "bullet list" format. Third, $e_d(i_{leaf},j)$ must indicate that the text is in a bold format. An example is illustrated in page 300 in FIG. 3.

Figure 3:
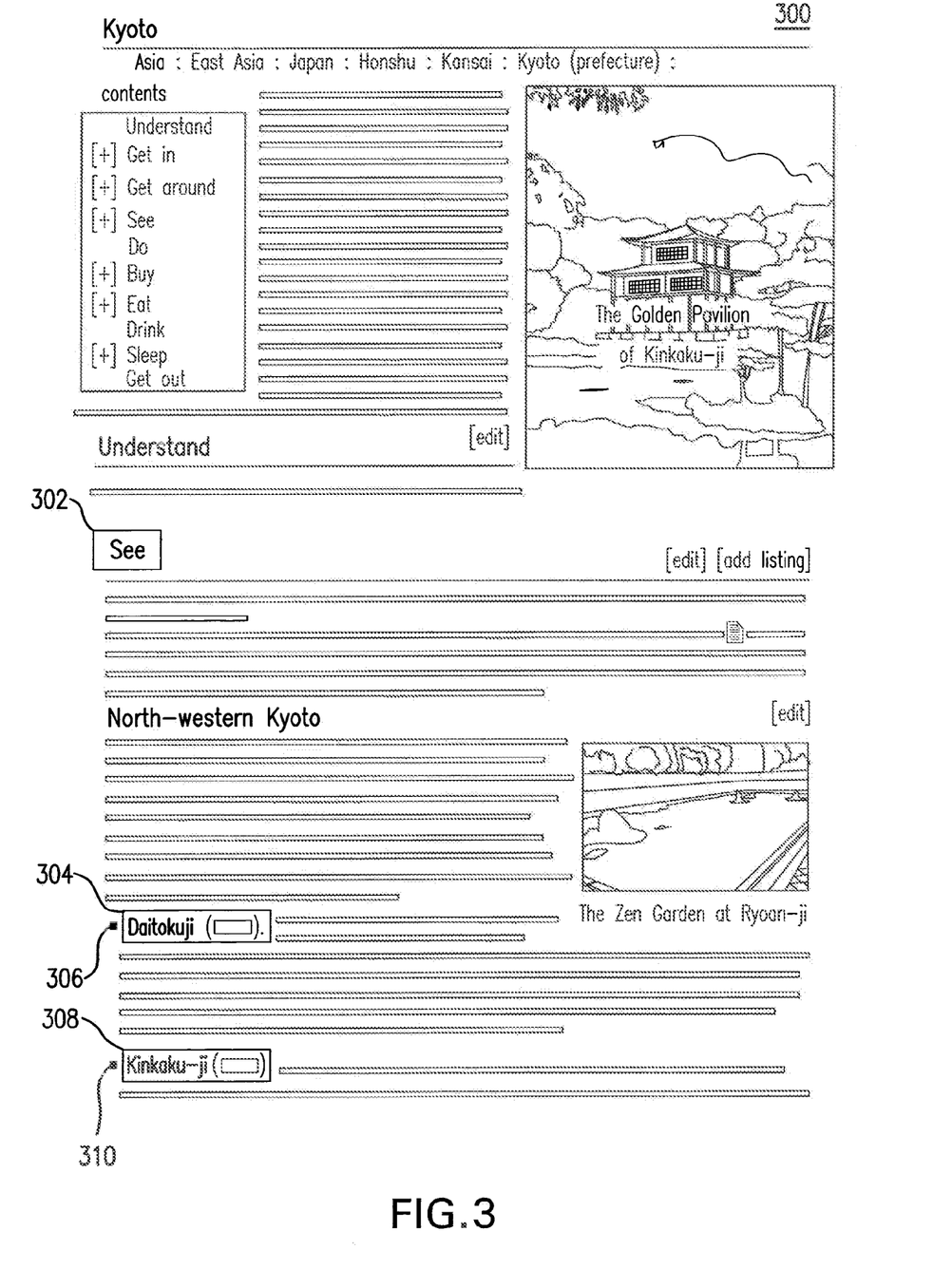
FIG. 3 is a diagram illustrating an example of parsing web data to determine landmark information.

Page 300 is an HTML document that has a tree structure of HTML elements. Among the leaf elements in the tree, text 304 and 308 satisfy the three conditions above. Text 304 and 308 are within a section entitled "See" as illustrated by a section header 302. Text 304 and 308 are child elements of bullets as illustrated by bullets 306 and 310. Finally, text 304 and 308 are formatted in boldface. Thus, text 304 and 308 are candidates for landmark names.

As mentioned earlier, the quality of the candidate landmark names parsed from the web data depends on the regularity of the data structure. Some text may be incorrectly parsed from the web data. To filter out data incorrectly parsed, one or more error checking rules are applied at step 206. As mentioned earlier, the error checking rules may include checking to see if a landmark name is too long or if most of its words are not capitalized. Using these rules some of the candidate landmark names may be rejected. The result is an accurate list of landmark names. Also some of the landmark location information may be recorded as well, such as the city, country or continent where the landmark is located. In the example with a wikitravel.com site, approximately 7000 landmarks may be included in the list.

Using the landmark data, landmark images are retrieved at step 208. Landmark images may be retrieved by sending a request to an image search service. The request may include a search query generated using landmark data as described above. In response to the request, the image search service returns results. Example results are illustrated in a page 400 in FIG. 4.

The result may include some images that are not pictures of the landmark. For example, some images may be maps, logos, etc. At step 210, image checking rules may be applied to prune out these false positive search hits. As described above, the image checking rules may include applying image classifiers trained to detect undesirable types of images. In one embodiment, the pruning of step 210 may occur subsequent to the visual clustering in step 212.

Figure 4:
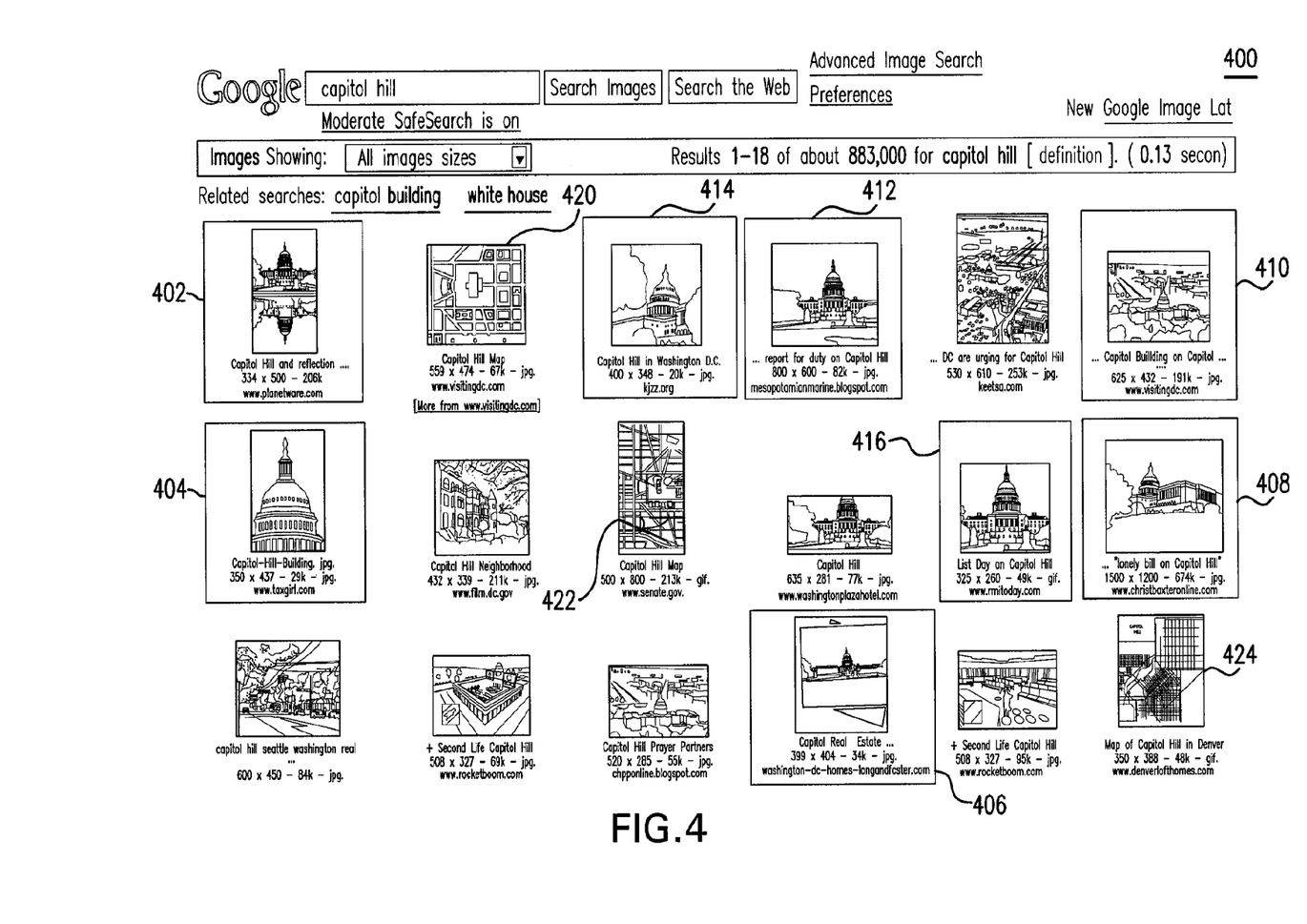
FIG. 4 is a diagram illustrating an example of extracting landmark images from results of an image search.

Page 400 shows an example result set returned by an image search engine. Among the results are maps 420, 422, and 424. Map images, such as maps 420, 422, and 424, may not helpful in developing a visual model able to recognize landmark images. For this reason, a classifier trained to detect maps may be used to detect these images. When maps 420, 422, and 424 are detected, they may not be removed from the result set.

After some of the false positives are filtered out, visual clustering may be used to generate a visual model at step 212. Visual clustering has the ability to identify similar images. In page 400, visual clustering may identify images 402, 404, 406, 408, 410, 412, 414, and 416 as being similar. In this way a pool of images of the landmark are identified to use as a visual model. Further, visual clustering may be used to recognize the landmark in other images. In this way, visual clustering narrows the images from the result set and may be used to recognize the landmark in other images.

At step 214, a geolocation (e.g., latitude and longitude) of the landmark is determined. As discussed above, the geolocation may be determined by requesting a geolocation from a geocoding service. As mentioned earlier, in the example where landmarks are extracted from a wikitravel site, about 7000 different landmarks, along with city and country information for each landmark, may be determined. In an example, a GOOGLE geocoding service may be used to determine the geolocations. In an example, of the about 7000 different landmarks extracted from wikitravel.com, about 2000 may have geolocations available from the GOOGLE geocoding service. The approximately 2000 geolocations are illustrated in a diagram 500 in FIG. 5.

Figure 5:
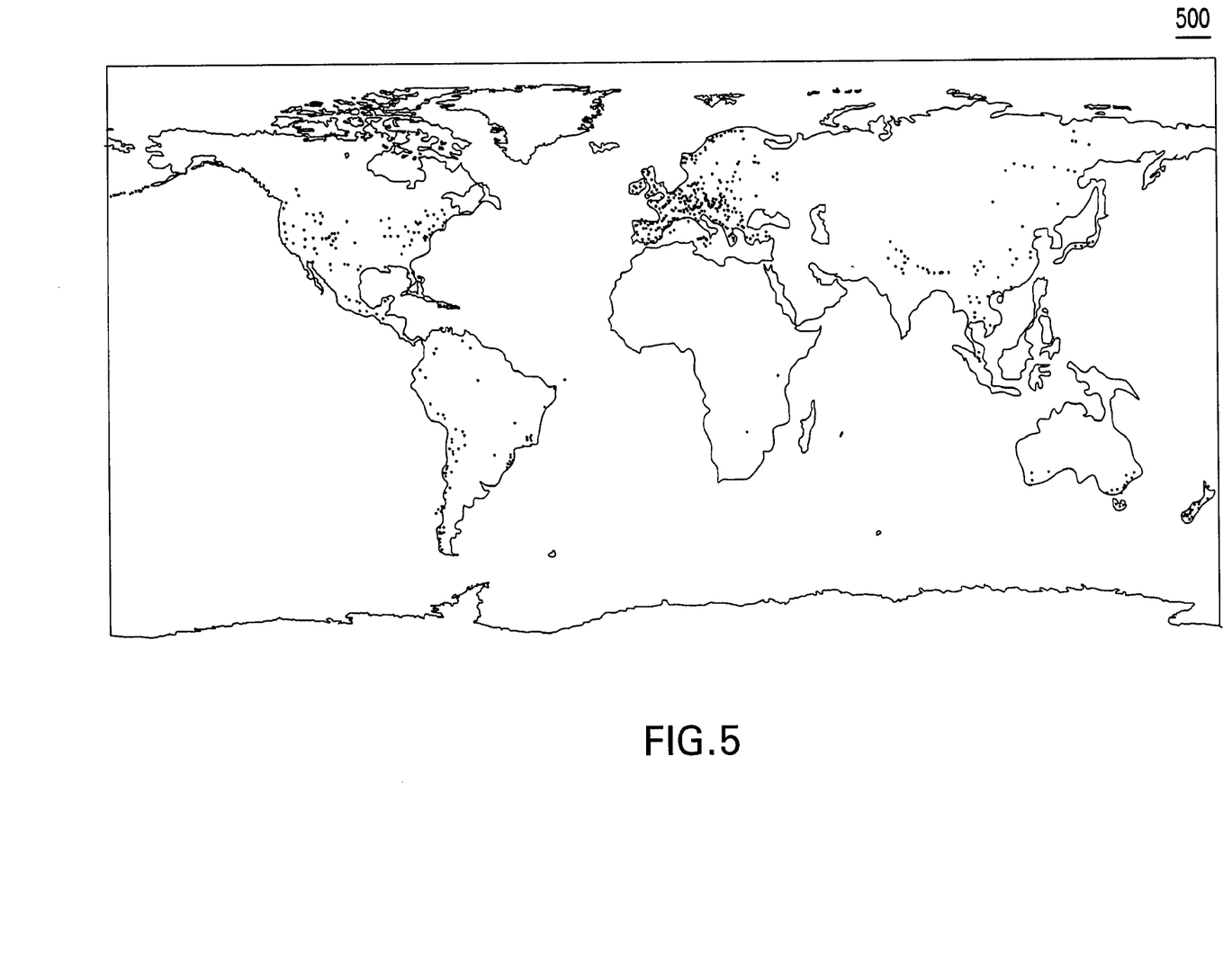
FIG. 5 is a map illustrating locations of landmarks in an example landmark database built according to an embodiment of the present invention.

FIG. 5 shows diagram 500 with a map of the geocoded locations of landmarks indicated by dots that may be identified in an example embodiment of the present invention. The map shows that the list of landmarks is large and comprehensive. Also, the landmarks identified are widely distributed across the globe as opposed narrowly tailored to the interests of a particular user group.

Examples have been provided with respect to a wikitravel.com site and GOOGLE image search and geocoding services. These examples are illustrative and are not meant to limit the present invention. Embodiments of the present invention may be used to extract landmarks from a wide variety of websites.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications of such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for building a landmark database, comprising:
    receiving web data including a web page from one or more websites via one or more networks;
    interpreting the web data using at least one processor to extract landmark data describing a landmark from the web data, the landmark data including a name that identifies the landmark and a portion of a street address where the landmark is located;
    applying one or more error checking rules to remove inaccurate landmark data from the landmark data;
    sending a search query to an image search service based on the landmark data;
    receiving a set of image search results from the image search service;
    filtering using one or more image checkers to remove non-photographic images from the set of image search results;
    generating a visual model using the filtered image search results;
    sending, to a geocoding service, a request with the name of the landmark and the portion of the street address where the landmark is located;
    receiving, in response to the request, a location of the landmark from the geocoding service, the location determined based on the name of the landmark and the portion of the street address where the landmark is located; and
    recognizing the landmark in an image different from the images in the filtered image search results by correlating the image with the visual model, and the location.

2. A computer-implemented method for building a landmark database, comprising:
    receiving web data including a web page comprising a first image of a landmark and text from one or more websites via one or more networks;
    interpreting the web data using at least one processor to extract landmark data describing the landmark in the first image from the text in the web data, wherein the landmark data comprises landmark name data that identifies the landmark;
    applying one or more error checking rules to the landmark name data to remove inaccurate landmark name data, wherein the applying comprises checking name length of the landmark name data and capitalization of the landmark name data;
    geocoding a location of the landmark in the first image by sending a request to a geocoding service, the request based on the landmark name data;
    sending a search query to an image search service, the search query based on the landmark name data;
    receiving a set of image search results from the image search service;
    filtering using one or more image checkers to remove images of landmarks obstructed by one or more faces, non-photographic images, and images of maps from the set of image search results;
    generating a visual model for the landmark using the filtered image search results; and
    recognizing the landmark in a target image different from images in the filtered image search results by correlating the target image with the visual model and the location of the landmark.

3. The method of claim 2, wherein interpreting the web data comprises parsing the web data to determine the landmark data according to one or more extraction rules.

4. The method of claim 2, further comprising storing the visual model and a portion of the landmark data in a database of landmarks.

5. The method of claim 2, wherein the landmark data further comprises a portion of a street address where the landmark is located.

6. The method of claim 5, wherein geocoding the location of the landmark in the first image by sending the request to the geocoding service comprises sending the request comprising the landmark name data and the portion of the street address where in the landmark is located, the method further comprising:
    receiving, from the geocoding service, in response to the request, a location of the landmark, the location determined based on the landmark name data and the portion of the street address where the landmark is located.

7. The method of claim 2, further comprising storing, in a database of landmarks, the visual model and a portion of the landmark data identifying the landmark.

8. The method of claim 2, wherein receiving the set of image search results from the image search service comprises receiving at least one image search result that comprises an image of the landmark.

9. The method of claim 2, wherein generating the visual model further comprises applying a detector to determine that a result in the set of image search results does not include an image of the landmark.

10. The method of claim 2 further comprising recognizing the landmark in an image from a frame of a video.

11. A system for building a landmark database, comprising:
    one or more processors;
    a web data retriever module implemented on at least one computing device configured to receive web data including a web page comprising a first image of a landmark from one or more websites via one or more networks;
    a web data interpreter module implemented on the at least one computing device configured to interpret the web data to extract landmark data describing the landmark in the first image from text in the web data, wherein the landmark data comprises landmark name data that identifies a landmark;
    an error checker module implemented on the at least one computing device configured to apply one or more error checking rules to the landmark name data to remove inaccurate landmark name data, wherein the error checking rules comprise checking name length of landmark name data and checking capitalization of landmark name data;

a geocoding module implemented on the at least one computing device configured to geocode a location of the landmark in the first image by sending a request to a geocoding service, the request based on the landmark name data;

a visual model generator implemented on the at least one computing device configured to send a search query to an image search service based on the landmark name data, receive a set of image search results from the image search service, filter the received image search results using one or more image checkers to remove images of landmarks obstructed by one or more faces, non-photographic images, and images of maps, and generate a visual model using the filtered image search results; and a landmark recognition engine implemented on the at least one computing device configured to recognize the landmark in a target image different from the images in the filtered image search results by correlating the target image with the visual model and the location of the landmark.

12. The system of claim 11, wherein the web data interpreter module parses the web data to determine the landmark data according to one or more extraction rules.

13. The system of claim 11, further comprising a landmark database that stores the visual model and a portion of the landmark data identifying the landmark.

14. The system of claim 11, wherein the landmark data further comprises a portion of a street address where the landmark is located, the geocoding module further configured to send the request based on the landmark name data and the portion of a street address where the landmark is located to the geocoding service and to receive the location of the landmark from the geocoding service in response to the request.

15. The system of claim 14, further comprising a landmark database that stores the visual model and a portion of the landmark data.

16. The system of claim 11, wherein at least one result in the image search results comprises an image of the landmark.

17. The system of claim 11, wherein the visual model generator further comprises detector to determine that a result in the set of image search results does not include the landmark.

18. The system of claim 11, wherein the landmark recognition engine is further configured to recognize the landmark in an image from a frame of a video.

19. The method of claim 2, wherein interpreting the web data to extract landmark data comprises identifying one or more tags and one or more headers in the web data.

20. The system of claim 11, wherein the web data interpreter module is configured to interpret the web data by identifying one or more tags and one or more headers in the web data.

\* \* \* \* \*